US009547640B2

(12) United States Patent
Bostick et al.

(10) Patent No.: US 9,547,640 B2
(45) Date of Patent: Jan. 17, 2017

(54) ONTOLOGY-DRIVEN ANNOTATION CONFIDENCE LEVELS FOR NATURAL LANGUAGE PROCESSING

(71) Applicant: International Business Machines Corporation, Armonk, NY (US)

(72) Inventors: James E. Bostick, Cedar Park, TX (US); John M. Ganci, Jr., Cary, NC (US); Ibrahim Salah, Cairo (EG); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 440 days.

(21) Appl. No.: 14/055,185

(22) Filed: Oct. 16, 2013

(65) Prior Publication Data

US 2015/0106079 A1 Apr. 16, 2015

(51) Int. Cl.
*G06F 17/27* (2006.01)
*G06F 17/30* (2006.01)
*G06F 17/28* (2006.01)

(52) U.S. Cl.
CPC ..... *G06F 17/2775* (2013.01); *G06F 17/30663* (2013.01); *G06F 17/271* (2013.01); *G06F 17/274* (2013.01); *G06F 17/2705* (2013.01); *G06F 17/2785* (2013.01); *G06F 17/28* (2013.01)

(58) Field of Classification Search
CPC .... G06F 17/28; G06F 17/274; G06F 17/2785; G06F 17/2705; G06F 17/271; G06F 17/2775
See application file for complete search history.

(56) References Cited

U.S. PATENT DOCUMENTS

| 5,331,556 A | 7/1994 | Black, Jr. et al. |
| 5,414,797 A * | 5/1995 | Vassiliadis ............... G06F 8/20 706/46 |
| 6,915,300 B1 * | 7/2005 | Roux ............... G06F 17/30684 707/706 |

(Continued)

OTHER PUBLICATIONS

Simperl et al.; Creating ontologies for content representation—the OntoSeed suite; On the Move to Meaningful Internet Systems 2005: CoopIS, DOA, and ODBASE Lecture Notes in Computer Science vol. 3761, 2005, pp. 1296-1313.

(Continued)

*Primary Examiner* — Matthew Baker
(74) *Attorney, Agent, or Firm* — Schmeiser, Olsen & Watts; William H. Hartwell

(57) ABSTRACT

An approach for determining a combination of terms that represents subject matter of a natural language sentence is provided. Numbers of words from a beginning of the sentence to terms in the sentence that match terms in the combination of terms are determined. The sentence is divided into natural language phrases including a complex phrase and first and second simple phrases extracted from the complex phrase. Based in part on (a) the numbers of words from the beginning of the sentence to the terms in the sentence that match terms in the combination of terms, (b) whether all terms of the combination are contained in the first and/or second simple phrases, and (c) whether all terms of the combination are contained in the complex phrase but not contained in the first and/or second simple phrases, how well the combination of terms represents the subject matter is determined.

17 Claims, 5 Drawing Sheets

(56) References Cited

U.S. PATENT DOCUMENTS

| | | | |
|---|---|---|---|
| 7,194,450 B2* | 3/2007 | Roux | G06F 17/3069 |
| 7,711,547 B2* | 5/2010 | Abir | G06F 17/3061 |
| | | | 704/7 |
| 7,860,706 B2* | 12/2010 | Abir | G06F 17/2872 |
| | | | 704/4 |
| 7,962,326 B2* | 6/2011 | Tsourikov | G06F 17/2785 |
| | | | 704/9 |
| 8,332,434 B2 | 12/2012 | Salkeld et al. | |
| 8,359,193 B2 | 1/2013 | Chen et al. | |
| 8,370,129 B2* | 2/2013 | Zhang | G06F 17/30654 |
| | | | 704/9 |
| 8,533,208 B2* | 9/2013 | Sundaresan | G06F 17/2785 |
| | | | 704/9 |
| 9,043,197 B1* | 5/2015 | Pasca | G06F 17/30654 |
| | | | 704/10 |
| 2002/0116176 A1* | 8/2002 | Tsourikov | G06F 17/2785 |
| | | | 704/9 |
| 2003/0212673 A1* | 11/2003 | Kadayam | G06F 17/30864 |
| 2007/0078814 A1* | 4/2007 | Flowers | G06F 17/30684 |
| 2007/0179776 A1* | 8/2007 | Segond | G06F 17/2247 |
| | | | 704/9 |
| 2008/0154848 A1* | 6/2008 | Haslam | G06F 17/30011 |
| 2009/0076799 A1* | 3/2009 | Crouch | G06F 17/2785 |
| | | | 704/9 |
| 2010/0063796 A1* | 3/2010 | Rehberg | G06F 17/2785 |
| | | | 704/9 |
| 2010/0114574 A1* | 5/2010 | Liu | G10L 15/19 |
| | | | 704/251 |
| 2011/0078167 A1* | 3/2011 | Sundaresan | G06F 17/2785 |
| | | | 707/765 |

OTHER PUBLICATIONS

Maynard et al.; NLP Techniques for Term Extraction and Ontology Population; Proceedings of the 2008 conference on Ontology Learning and Population: Bridging the Gap between Text and Knowledge, pp. 107-127.

* cited by examiner

114 ⤴

| pipe 304 | got 312 | stuck 314 | and | no | downward | movement | cannot | pull | up |
|---|---|---|---|---|---|---|---|---|---|
| Noun 306 | Verb (Gerund) | Verb (Past Part.) | | Determiner | Adjective | Noun | Modal | Verb | Particle |
| Noun Phrase 308 | Verb Phrase 310 | Verb Phrase | Coordinating Conjunction | Noun Phrase 316 | | | Verb Phrase 318 | | |
| | Subject | | | Subject 302 | | | | | | pipe got stuck and no downward movement cannot pull up

*FIG. 3*

ONTOLOGY-DRIVEN ANNOTATION CONFIDENCE LEVELS FOR NATURAL LANGUAGE PROCESSING

TECHNICAL FIELD

The present invention relates generally to annotating text of a natural language, and more specifically to determining key terms that represent subject matter of a larger body of text.

BACKGROUND

Natural language processing (NLP) identifies entities or objects in unstructured text of a document and determines relationships between the entities. An NLP engine identifies the entities or objects and variations of the entities or objects by matching tokens or words in the unstructured text to entries in a dictionary containing key terms and variations of the key terms. The corresponding dictionary entries represent the entities or objects in the unstructured text. A person makes a limited, inflexible Boolean decision as to whether an annotation or concept based on the matched entries should be applied to the tokens or words.

U.S. Pat. No. 8,332,434 to Salkeld et al. teaches a system to map a set of words to a set of ontology terms. A term set corresponding to a set of words in an ontology context is determined for different starting points of ontology contexts. The term sets acquired from each of the starting points are ranked using a goodness function considering both consistency and popularity. A term which has a very high term rank is degraded or discarded if its ontology has a trivial correlation with the starting point ontology.

BRIEF SUMMARY

An embodiment of the present invention is a method, computer system and computer program product for determining a combination of terms that represents subject matter of a natural language sentence. Respective numbers of words from a beginning of a sentence to respective terms in the sentence that match terms in the combination of terms are determined. The sentence is divided in a multiplicity of natural language phrases including a complex phrase and first and second simple phrases extracted from the complex phrase. The complex phrase is less that an entirety of the sentence. Based in part on (a) the respective numbers of words from the beginning of the sentence to respective terms in the sentence that match terms in the combination of terms, (b) whether all terms of the combination are contained in the first and/or second simple phrases, and (c) whether all terms of the combination are contained in the complex phrase but not contained in the first and/or second simple phrases, how well the combination of terms represents the subject matter of the sentence is determined.

Embodiments of the present invention provide natural language processing for annotating unstructured text that increases recall over the known dictionary-based token matching approaches, while generating a confidence level to assess precision. The confidence level provides a more flexible assessment of precision compared to the inflexible Boolean determinations of known annotation approaches.

BRIEF DESCRIPTION OF THE DRAWINGS

FIG. 3 depicts an example of a parse tree generated by the confidence level generation program executed in a computer system included in the system of FIG. 1, in accordance with embodiments of the present invention.

DETAILED DESCRIPTION

Overview

Embodiments of the present invention determine a confidence level indicating a likelihood that a predetermined combination of terms represents a concept or essence of unstructured, natural language text, such as a sentence or group of sentences of a natural/human language. The unstructured text may be a user query, expressed in a sentence instead of key words, in a natural language to an expert system where the overall meaning of the unstructured text correlates to something that the user wants, such as a help tutorial or a product. Instead of a search engine searching documents for the entirety of the text in the query, embodiments of the present invention correlate the unstructured text of the query to predetermined combinations of terms or key words that are used to search documents. The predetermined combinations of terms are sometimes referred to as semantic types, and a specific combination of terms selected according to the highest confidence level may be used as a set of search terms. As explained in more detail below, the confidence level for the representative search terms is based on two different measurements of proximity between tokens (e.g., words) within the unstructured text that match the terms (or synonyms thereof) in the predetermined combination of terms. In general, words (or their synonyms) that are closer to each other in a sentence are given more weight than words (or their synonyms) that are further from each other in the sentence. Also, words (or their synonyms) that occur together in a simple phrase that is contained in a complex phrase in a sentence are given more weight than words (or their synonyms) that occur together in the complex phrase but not in any simple phrase in the sentence.

System for Generating a Confidence Level of a Combination of Terms

Figure 1:
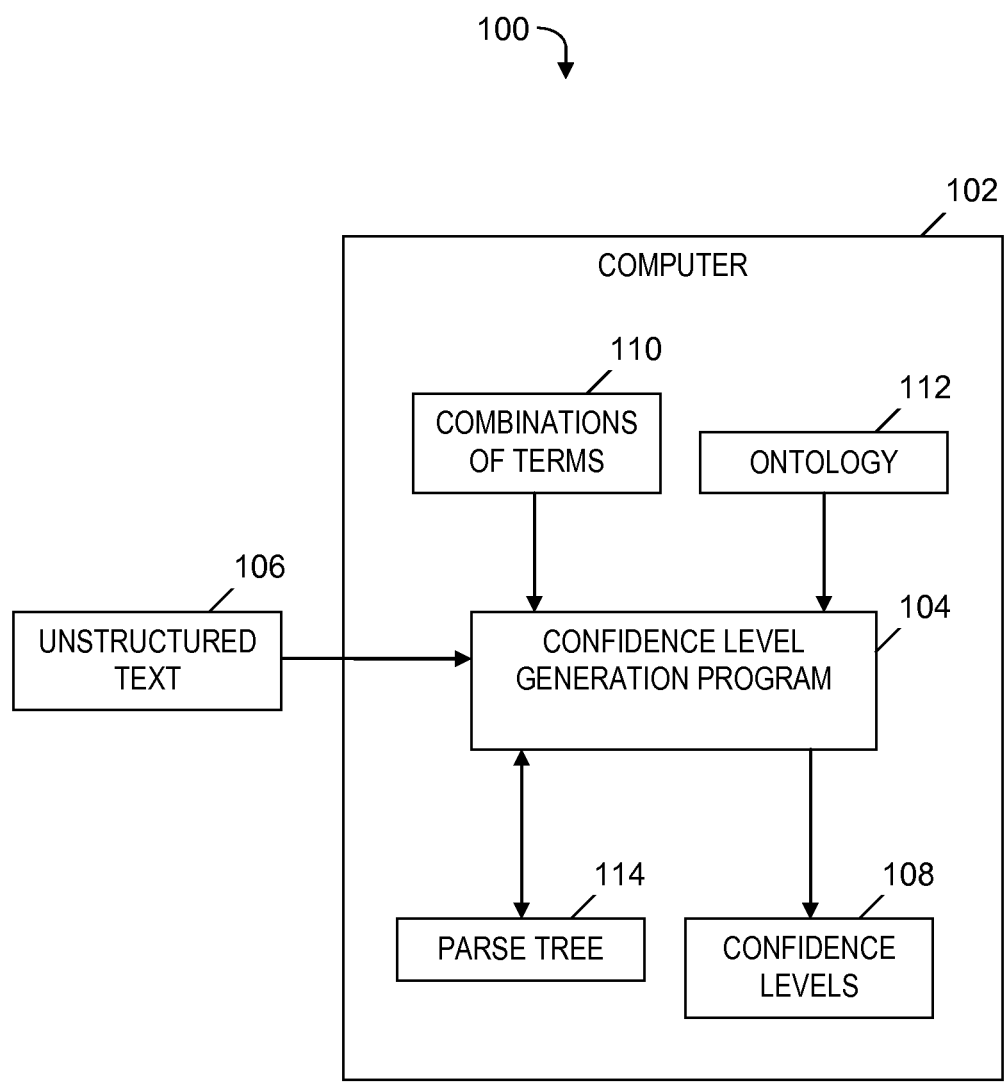
FIG. 1 is a block diagram of a system for generating a confidence level of a combination of terms, in accordance with embodiments of the present invention.

FIG. 1 is a block diagram of a system 100 for generating a confidence level of a combination of terms, in accordance with embodiments of the present invention. System 100 includes a computer 102, which may include any type of computing system(s) including, for example, a personal computer, a mainframe computer, a tablet computer, a laptop computer, a server, etc. Computer 102 includes a central processing unit (CPU) (not shown), tangible data storage device(s) (not shown) and a memory (not shown). Computer 102 utilizes the CPU to execute a software-based confidence level generation program 104 (i.e., computer program instructions) stored in the tangible storage device(s) via the memory (not shown) to receive unstructured text 106 in a natural language and to generate confidence levels 108 of respective predetermined combinations of terms 110, where a generated confidence level 108 indicates a likelihood that the respective combination of terms 110 is subject matter, a concept, or an essence of unstructured text 106. Confidence level generation program 104 (1) identifies combination of terms 110 that occur in unstructured text 106 based on rules in an ontology 112; (2) generates a parse tree 114 that includes the unstructured text 106 as a root and the terms and phrases of unstructured text 106 as nodes; (3) determines a first proximity measurement based on distances of terms in combination of terms 110 from the beginning of unstructured text 106; and (4) determines a second proximity measurement based on distances of the terms from the root of parse tree 114. Confidence level generation program 104 generates confidence level 108 of combination of terms 110 based on the first and second proximity measurements. In one embodiment, parse tree 114 is a phrase structure parse tree formed by a deep parse. Each node in a phrase structure parse tree contains a word or a phrase (e.g., noun phrase or verb phrase). Each of the phrases in the phrase structure parse tree can include word(s) and/or one or more other phrases.

As one example, computer 102 receives a user-provided sentence as unstructured text 106, where the sentence queries a manufacturer's expert system (not shown) about a product provided by the manufacturer and for which the user wants additional information. Confidence level generation program 104 identifies a predetermined combination of terms 110 having first and second terms (or synonyms of the terms) that match respective first and second words occurring in the user-provided sentence. Confidence level generation program 104 generates parse tree 114 so that the sentence is the root of parse tree 114 and the words, elements of phrases, and phrases of the sentence are nodes. Confidence level generation program 104 determines the first proximity measurement based on a difference between a first distance of the first word from the beginning of the sentence and a second distance of the second word from the beginning of the sentence. Confidence level generation program 104 determines the second proximity measurement based on a difference between a first number of levels and a second number of levels of parse tree 114. The first number of levels is the number of levels between the first word and the root of parse tree 114. The second number of levels is the number of levels between the second word and the root of parse tree 114. Based on the first and second proximity measurements, confidence level generation program 104 determines a likelihood that the identified two-term combination indicates a concept or subject matter of the user-provided sentence. The present invention is equally applicable to three, four and even greater numbers of terms in combination.

Internal and external components of computer 102 are further described below relative to FIG. 4. The functionality of components of system 100 is further described below in the discussion relative to FIGS. 2A-2B.

Figure 2A:
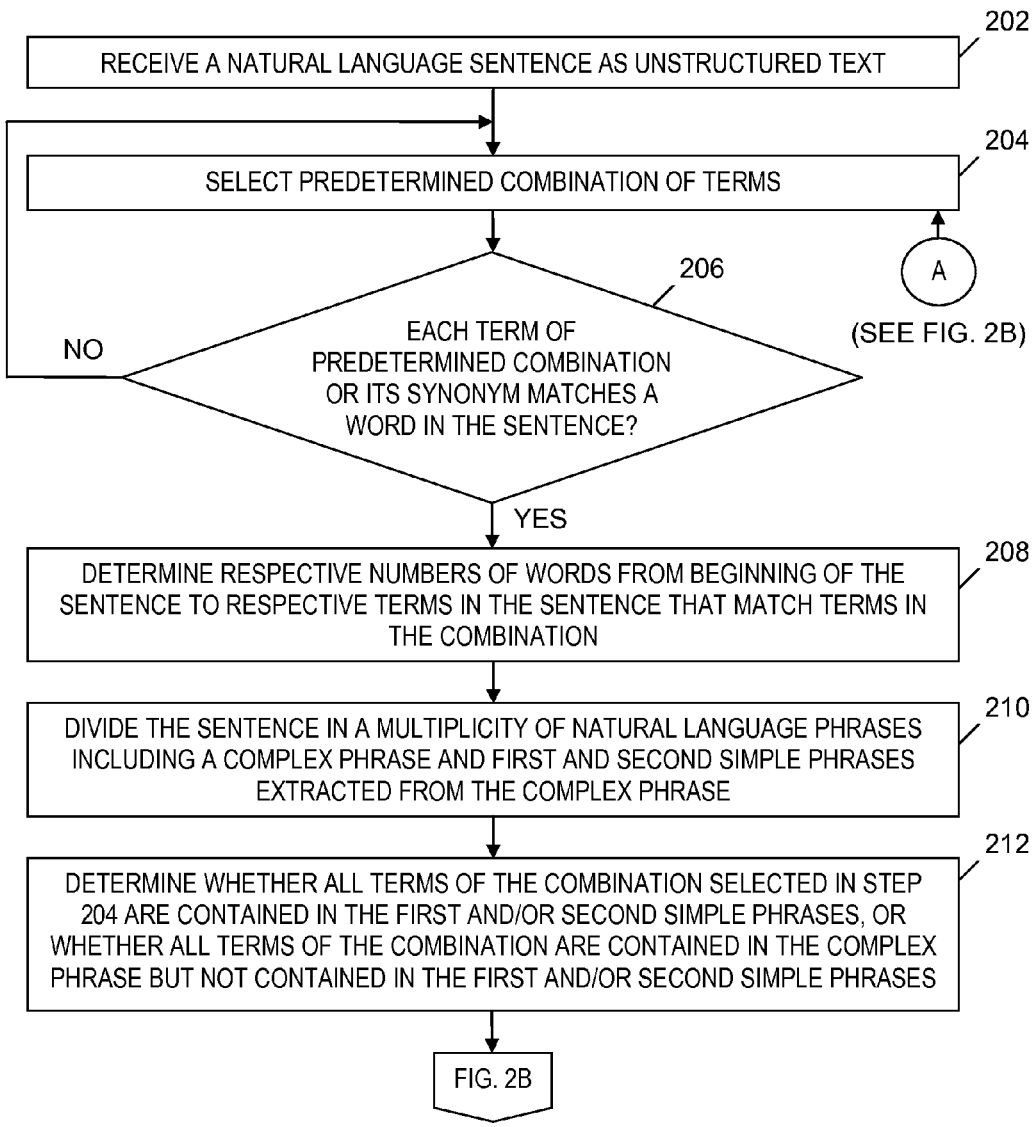
FIGS. 2A-2B depict a flowchart of a confidence level generator program executed in a computer system included in the system of FIG. 1, in accordance with embodiments of the present invention.
Figure 2B:
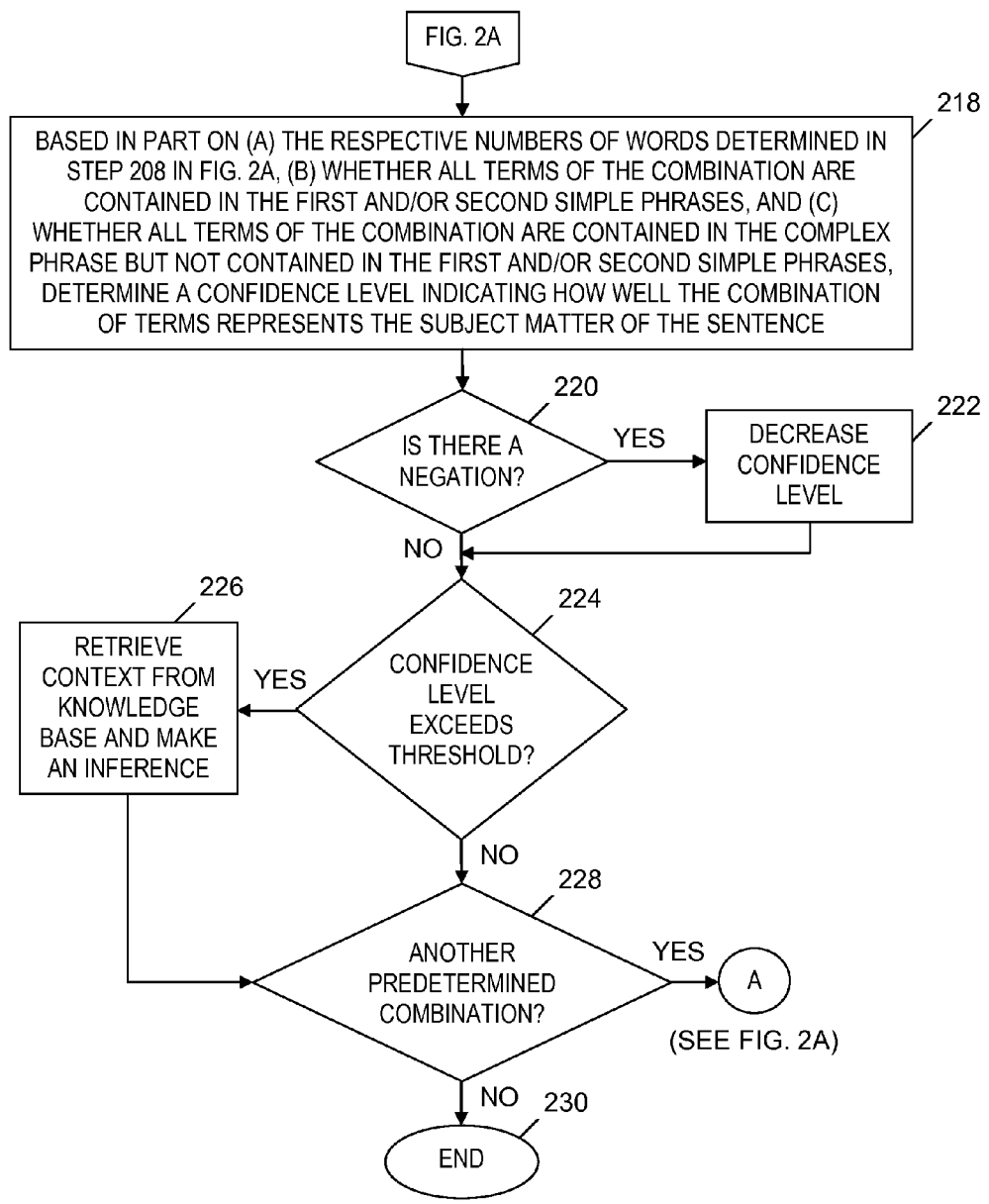

FIGS. 2A-2B depict a flowchart of a confidence level generator program executed in a computer system included in the system of FIG. 1, in accordance with embodiments of the present invention. In step 202, confidence level generator program 104 (see FIG. 1) receives a natural language sentence, input by a user, as unstructured text 106 (see FIG. 1). Alternatively, program 104 (see FIG. 1) can receive multiple sentences and other types of unstructured text.

Prior to step 204, confidence level generator program 104 (see FIG. 1) generates a plurality of combinations of terms 110 (see FIG. 1) by utilizing rules in ontology 112 (see FIG. 1), where the combinations of terms 110 (see FIG. 1) are concepts that potentially represent subject matter of the sentence received in step 202. Each rule in ontology 112 (see FIG. 1) specifies a relationship between words included in the sentence received in step 202 and a specific combination of terms 110 (see FIG. 1). For example, confidence level generator program 104 (see FIG. 1) identifies "pipe" and "stuck" in the sentence received in step 202 and uses the rule StuckPipe hasChild Pipe, Stuck in ontology 112 (see FIG. 1) to generate the combination of terms (i.e., concept) "Stuck-Pipe".

In step 204, confidence level generator program 104 (see FIG. 1) selects a first predetermined combination of terms from the plurality of combinations of terms 110 (see FIG. 1), and determines an initial value of confidence level 108 (see FIG. 1). Each loop back to step 204 (described below) selects a next combination of terms from the plurality of combinations of terms 110 (see FIG. 1). In one embodiment, the initial value of confidence level 108 (see FIG. 1) is 100%. If the combination of terms selected in step 204 is based on one or more previously processed combinations of terms, the initial value of confidence level 108 (see FIG. 1) may be less than 100%. For example, confidence level generator program 104 (see FIG. 1) forms the combination "pump pressure" from "pump" and "pressure" with a confidence level of 70% and forms the combination of "pressure increase" from "pressure" and "increase" with a confidence level of 80%. In this example, confidence level generator program 104 (see FIG. 1) subsequently forms "pump pressure increase" from the previously formed "pump pressure" and "pressure increase" with an initial value of confidence level 108 (see FIG. 1) of 75%. In this example, the 75% is selected to be midway between the 70% level for "pump pressure" and the 80% level for "pressure increase" but other factors (e.g., one term is more important due to higher frequency) could be taken into account to weight "pump pressure" and "pressure increase" differently so that another value between 70% and 80% is selected. In one embodiment, the plurality of combinations of terms is expressed in a Resource Description Framework (RDF) data model.

In step 206, confidence level generator program 104 (see FIG. 1) determines whether each term (or a synonym thereof) of the combination of terms 110 (see FIG. 1) received in step 204 matches a respective term (i.e., token or word) in the sentence received in step 202. That is, confidence level generator program 104 (see FIG. 1) determines in step 206 whether each term (or its synonym) of the combination of terms 110 (see FIG. 1) received in step 204 occurs in the sentence received in step 202. If confidence level generator program 104 (see FIG. 1) determines in step 206 that each term (or its synonym) of the combination of terms 110 (see FIG. 1) matches respective terms in the sentence received in step 202, then the Yes branch of step 206 is taken and step 208 is performed. Hereinafter, the terms in the sentence matched to the terms or synonyms in the combination of terms 110 (see FIG. 1) in step 206 are also referred to as "matched words."

In step 208, confidence level generator program 104 (see FIG. 1) determines respective numbers of words (i.e., distances) from the beginning of the sentence received in step 202 to respective matched words in the sentence. In one embodiment, confidence level generator program 104 (see FIG. 1) determines the number of words (i.e., distance) from the beginning of the sentence to a matched word to be equal to the ordinal value of the matched word in the sequence of words that comprise the sentence (i.e., the first word in the sentence has a distance of 1, the second word in the sentence has a distance of 2, . . . , the N-th word in the sentence has a distance of N). For example, the distance of "pipe" in the sentence "pipe got stuck" is three because "pipe" is the third word in the sentence.

In one embodiment, the determination of the numbers of words in step 208 and the ordinal value of a matched word in a sentence that is a transcription of speech ignores terms in the sentence that are the result of speech disfluencies (e.g., words and sentences cut off in mid-utterance, phrases that are restarted or repeated, repeated syllables, grunts, and non-lexical utterances such as "uh").

In one embodiment, the determination of the numbers of words in step 208 and the ordinal value of a matched word in a sentence ignores words in the sentence whose word class is not an open class. In one embodiment, English words that are in an open class consist of nouns, verbs, adjectives, and adverbs. For example, in the sentence "The pipe got stuck", because the word "The" is a pronoun which is not in an open class, the word "The" is ignored in the determination of a number of words from the beginning of the sentence to the word "pipe" in step 208 (i.e., the number of words from the beginning of the sentence to "pipe" is one because "pipe" is the first open class word in the sentence).

In step 210, confidence level generator program 104 (see FIG. 1) divides the sentence received in step 202 into a multiplicity of natural language phrases, including a complex phrase and first and second simple phrases extracted from the complex phrase. The multiplicity of natural language phrases can include one or more complex phrases, and each complex phrase can include one or more simple phrases and/or one or more other complex phrases. A complex phrase is less than the entirety of the sentence received in step 202.

In one embodiment, confidence level generation program 104 (see FIG. 1) generates parse tree 114 (see FIG. 1), which includes the multiplicity of natural language phrases into which the sentence received in step 202 was divided in step 210. The parse tree 114 (see FIG. 1) can be in the form of a table having entries in rows. A top row of the table includes entries that contain respective words in the sentence received in step 202.

In step 212, confidence level generator program 104 (see FIG. 1) determines (a) whether all terms of the combination selected in step 204 are contained in the first and/or second simple phrases included in the aforementioned natural language phrases, or (b) whether all terms of the combination selected in step 204 are contained in the complex phrase included in the aforementioned natural language phrases, but not contained in the first and/or second simple phrases.

In one embodiment, confidence level generator program 104 (see FIG. 1) makes the determination in step 212 by identifying the complex phrase and the first and second simple phrases in parse tree 114 (see FIG. 1), which confidence level generator program 104 (see FIG. 1) generates from the sentence received in step 202. Confidence level generator program 104 (see FIG. 1) determines whether all terms of the combination selected in step 204 are included in a first node in parse tree 114 (see FIG. 1) that contains the first simple phrase and/or in a second node in parse tree 114 (see FIG. 1) that contains the second simple phrase. If confidence level generator program 104 (see FIG. 1) determines that all the terms in the combination are not included in the aforementioned first and/or second nodes in parse tree 114 (see FIG. 1), then confidence level generator program 104 (see FIG. 1) determines whether all terms of the combination are included in a third node in parse tree 114 (see FIG. 1) that contains the complex phrase but are not included in the aforementioned first and/or second nodes of parse tree 114 (see FIG. 1).

In step 218, based in part on (a) the respective numbers of words determined in step 208 (see FIG. 2A), (b) whether all terms of the combination selected in step 204 are contained in the first and/or second simple phrases included in the aforementioned natural language phrases, and (c) whether all terms of the combination selected in step 204 are contained in the complex phrase included in the aforementioned natural language phrases, but not contained in the first and/or second simple phrases, confidence level generator program 104 (see FIG. 1) determines a confidence level that indicates how well the combination of terms selected in step 204 represents subject matter of the sentence received in step 202 (see FIG. 2A).

Prior to step 218, confidence level generation program 104 (see FIG. 1) can receive or determine an initial confidence level (e.g., 100) that indicates how well the combination of terms represents the subject matter of the sentence received in step 202 (see FIG. 2A). The initial confidence level is adjusted to determine the confidence level in step 218.

In one embodiment, confidence level generation program 104 (see FIG. 1) in step 208 determines a difference between first and second numbers of words determined in step 208. The first number of words is a number of words from the beginning of the sentence received in step 202 (see FIG. 2A) to a first matched word in the sentence. The second number of words is a number of words from the beginning of the sentence received in step 202 (see FIG. 2A) to a second matched word in the sentence. Confidence level generation program 104 (see FIG. 1) in step 218 uses the difference between the first and second numbers of words as a basis for determining the confidence level. Confidence level generation program 104 (see FIG. 1) determines whether the aforementioned difference exceeds a predetermined threshold value. If the difference exceeds the threshold value, then confidence level generation program 104 (see FIG. 1) determines a first amount by which the difference exceeds the threshold. Confidence level generation program 104 (see FIG. 1) determines a second amount (a.k.a. first score) by multiplying the first amount by a predetermined factor. Confidence level generation program 104 (see FIG. 1) adjusts the confidence level by subtracting the second amount from the confidence level. Confidence level generation program 104 (see FIG. 1) receives the predetermined threshold value and predetermined factor from a user entry prior to step 218.

In one embodiment, confidence level generation program 104 (see FIG. 1) in step 210 (see FIG. 2A) generates parse tree 114 (see FIG. 1) as a deep parse tree having the sentence received in step 202 as a root of the parse tree and having the words and phrases of the sentence as the nodes of the parse tree 114 (see FIG. 1).

In one embodiment, parse tree 114 (see FIG. 1) represents a deep parse of the sentence received in step 202 (see FIG. 2A) as a tree having nodes that represent (1) complex phrase(s), (2) simple phrase(s) contained in each complex phrase and/or simple phrase(s) not included in any other phrase and not including any other simpler phrase, (3) parts of speech corresponding to words contained in the simple phrases or contained in the sentence but not contained in any phrase, and (4) words contained in the simple phrases or contained in the sentence but not contained in any phrase. In step 218, confidence level generator program 104 (see FIG. 1) determines depths of the matched words within parse tree 114 (see FIG. 1), where each depth is an ordinal value of the level of the node in parse tree 114 (see FIG. 1) based on a sequence of levels in a traversal of parse tree 114 (see FIG. 1) from the root to the matched word. For example, a traversal from the root of parse tree 114 (see FIG. 1) for the sentence "pipe got stuck" to the word "pipe" includes first, second and third levels of the parse tree: a node of "noun phrase" which is a phrase corresponding to "pipe" at the first level, a node of "noun" as the part of speech corresponding to "pipe" at the second level, and a node of "pipe" at the third level. Because the word "pipe" is at the third level in the traversal, "pipe" has a depth equal to three within the parse tree 114 (see FIG. 1).

In one embodiment, confidence level generator program 104 (see FIG. 1) determines in step 218 a difference between first and second depths of first and second matched words, respectively, in the sentence received in step 202, multiplies the difference by a predetermined factor (i.e., a factor received by confidence level generation program 104 (see FIG. 1) prior to step 202) to determine an amount (a.k.a. second score). Confidence level generation program 104 (see FIG. 1) further adjusts the confidence level 108 (see FIG. 1) by subtracting the amount from the confidence level.

In one embodiment, in step 218, confidence level generator program 104 (see FIG. 1) determines a confidence level by the following formula: confidence level=(initial confidence level–first score)–second score, where the first and second scores are described above. For the step of determining the confidence level as a percentage in step 218, the first and second scores are considered to be percentages that are subtracted from the initial confidence level to obtain the confidence level. For example, a first score of 5, a second score of 45 and an initial confidence level of 100% means that step 218 considers the first score of 5 to be 5% and the second score of 45 to be 45% and subtracts 5% and 45% from 100% to obtain the confidence level of 50% (i.e., (100%–5%)–45%=50%).

In step 220, confidence level generation program 104 (see FIG. 1) determines whether there is a negation (i.e., determines whether there are one or more terms in the sentence received in step 202 (see FIG. 2A) that negate the combination of terms 110 (see FIG. 1)). If confidence level generation program 104 (see FIG. 1) determines in step 220 that there is a negation, then the Yes branch of step 220 is taken and step 222 is performed. In step 222, confidence level generation program 104 (see FIG. 1) decreases the further adjusted confidence level resulting from step 218 by a predetermined negation amount. The confidence level generation program 104 (see FIG. 1) receives the predetermined negation amount prior to step 202 (see FIG. 2A). Step 224 follows step 222.

Returning to step 220, if confidence level generation program 104 (see FIG. 1) determines that there is no negation, then the No branch of step 220 is taken and step 224 is performed.

After step 222 or after taking the No branch of step 220 and prior to step 224, the confidence level resulting from step 222 (if step 224 follows step 222) or resulting from step 218 (if step 224 follows the No branch of step 220) is an indication of the likelihood that the combination of terms 110 (see FIG. 1) represents the subject matter of the sentence received in step 202 (see FIG. 2A). The subject matter represented by the combination of terms 110 (see FIG. 1) is an annotation correlated with the words in the sentence that match the combination of terms.

In step 224, confidence level generation program 104 (see FIG. 1) determines whether the confidence level resulting from step 222 (if step 224 follows step 222) or from step 218 (if step 224 follows the No branch of step 220) exceeds a predetermined threshold. If confidence level generation program 104 (see FIG. 1) determines in step 224 that the confidence level exceeds the predetermined threshold, then the Yes branch of step 224 is taken and step 226 is performed. The confidence level exceeding the predetermined threshold indicates that the combination of terms 110 (see FIG. 1) is likely to represent the subject matter of the sentence received in step 202 (see FIG. 2A). The confidence level generation program 104 (see FIG. 1) receives the predetermined threshold prior to step 202 (see FIG. 2A).

In step 226, confidence level generation program 104 (see FIG. 1) retrieves context from a knowledge base, and using the retrieved context, makes an inference based on the combination of terms 110 (see FIG. 1) likely representing the subject matter of the sentence received in step 202 (see FIG. 2A). In one embodiment, the sentence received in step 202 (see FIG. 2A) identifies a condition or problem and the context retrieved in step 226 is a possible cause of the condition or problem. For example, in an oil and gas drilling domain, confidence level generation program 104 (see FIG. 1) receives in step 202 (see FIG. 2A) the sentence "pressure at the pump has gained considerably," generates the combination of terms "PumpPressureIncrease," determines in step 224 that the subject matter of the sentence is a pump pressure increase with a confidence level that exceeds the threshold, retrieves in step 226 the additional context "settled cuttings," and makes an inference in step 226 that settled cuttings are the cause of the pump pressure increase. Step 228 follows step 226.

Returning to step 224, if confidence level generation program 104 (see FIG. 1) determines that the confidence level does not exceed the predetermined threshold, then the No branch of step 224 is taken and step 228 is performed. The confidence level not exceeding the predetermined threshold indicates that the combination of terms 110 (see FIG. 1) does not likely represent the subject matter the sentence received in step 202 (see FIG. 2A).

In step 228, confidence level generation program 104 (see FIG. 1) determines whether there is another predetermined combination of terms 110 (see FIG. 1) to be selected by the process of FIGS. 2A-2B. If confidence level generation program 104 (see FIG. 1) determines in step 228 that there is another predetermined combination of terms 110 (see FIG. 1) to be selected, then the Yes branch of step 228 is taken and the process of FIGS. 2A-2B loops back to step 204 (see FIG. 2A). If confidence level generation program 104 (see FIG. 1) determines in step 228 that there is no other predetermined combination of terms 110 (see FIG. 1) to be selected, then the No branch of step 228 is taken and step 230 is performed. In step 230, the process of FIGS. 2A-2B ends.

Example 1

As an example, a user enters the following sentence: "pipe got stuck and no downward movement cannot pull up", which may be the sentence received in step 202 (see FIG. 2A). Confidence level generation program 104 (see FIG. 1) selects a combination of terms "pipe" and "stuck." The selection of the combination of terms may be included in step 204 (see FIG. 2A). Using ontology 112 (see FIG. 1) that governs the construction of concepts, confidence level generation program 104 (see FIG. 1) forms the concept "StuckPipe" by using the following rule in the ontology: StuckPipe hasChild pipe, stuck. Variations of "pipe" and/or "stuck" in a sentence received in step 202 (see FIG. 2A) triggers the same rule. The formation of the concept "StuckPipe" may be included in step 204 (see FIG. 2A).

Confidence level generation program 104 (see FIG. 1) determines that each term in the combination of "pipe" and "stuck" is in the sentence "pipe got stuck and no downward movement cannot pull up," which may be included in step 206 (see FIG. 2A).

Confidence level generation program 104 (see FIG. 1) determines the distances of "pipe" and "stuck" in the sentence "pipe got stuck and no downward movement cannot pull up," which may be included in step 208 (see FIG. 2A). The distance of "pipe" in the sentence is equal to 1 because "pipe" is the first term in the sentence. The distance of "stuck" in the sentence is equal to 3 because "stuck" is the third term in the sentence.

In this example, confidence level generation program 104 (see FIG. 1) uses a predetermined maximum threshold of 3 and a predetermined factor of 10 to determine the first proximity of "pipe" and "stuck" in the sentence. The difference between the distance of "stuck" and the distance of "pipe" is 3−1=2 (i.e., the linear distance in the sentence between "pipe" and "stuck" is 2). The difference of 2 does not exceed the predetermined maximum threshold of 3, therefore the overage amount is 0 and the first score is 0 (i.e., overage amount×predetermined factor=first score, or 0×10=0), which may be in included in the determination of the first proximity in step 210 (see FIG. 2A).

In this example, confidence level generation program 104 (see FIG. 1) generates parse tree 114 depicted in FIG. 3. The generation of parse tree 114 may be included in step 212 (see FIG. 2A). Parse tree 114 includes a root 302 (also referred to herein as sentence 302), which is the sentence received in this example: "pipe got stuck and no downward movement cannot pull up." A first set of nodes in parse tree 114 in the first (i.e., uppermost) row in parse tree 114 includes the tokens (i.e., words) in the sentence. For example, pipe 304 indicates that "pipe" is a token of sentence 302. A second set of nodes of parse tree 114 that include "Noun," "Verb," "Coordinating Conjunction," "Determiner," "Adjective," "Modal" and "Particle" are the parts of speech of respective tokens appearing in the parse tree 114 directly above the respective parts of speech. For example, Noun 306 indicates that the part of speech of pipe 304 is Noun because "pipe" is the token directly above Noun 306 in parse tree 114. A third set of nodes of parse tree 114 include "Subject," "Noun Phrase," and "Verb Phrase" which indicate the phrase structures which include tokens in sentence 302. A phrase structure in parse tree 114 indicates that the one or more tokens that appear in the first row of parse tree 114 directly above the phrase structure are included in the phrase structure. For example, Noun Phrase 308 indicates that "pipe" is included in a noun phrase because pipe 304 is directly above Noun Phrase 308. As another example, Verb Phrase 310 indicates that "got stuck" is a verb phrase because "got stuck" (i.e., got 312 and stuck 314) appear in parse tree 114 above Verb Phrase 310.

Confidence level generation program 104 (see FIG. 1) determines the depth of "pipe" to be 4 (i.e., the fourth level in parse tree 114 above root 302 that occurs in a traversal from root 302 to pipe 304) and the depth of "stuck" to be 5 (i.e., the fifth level in parse tree 114 above root 302 that occurs in a traversal from root 302 to stuck 314). The aforementioned determination of the depths of 4 and 5 may be included in step 214 (see FIG. 2A).

Confidence level generation program 104 (see FIG. 1) uses a predetermined factor of 5 to determine a second proximity between "pipe" and "stuck" in sentence 302. The determination of the second proximity may be included in step 216 (see FIG. 2A). Confidence level generation program 104 (see FIG. 1) determines a difference between the depth of "stuck" and the depth of "pipe" (i.e., depth of "stuck"−depth of "pipe"=5−4=1). Confidence level generation program 104 (see FIG. 1) determines a second score by multiplying the difference between the depths by the predetermined factor (i.e., 1×5=5), which may be included in the determination of the second proximity in step 216 (see FIG. 2A).

Confidence level generation program 104 (see FIG. 1) determines a confidence level of 95% by using an initial confidence level of 100%, first subtracting the first score, and from the result, subtracting the second score (i.e., (100%−0%)−5%=95%). The determination of the confidence level of 95% may be included in step 218 (see FIG. 2B).

Confidence level generation program 104 (see FIG. 1) determines that although there is a negation token (i.e., "no") in the sentence, the negation does not apply to "pipe" or "stuck". The determination there is no negation applying to "pipe" or "stuck" may be included in step 220 (see FIG. 2B). Because there is no negation applying to "pipe" or "stuck", the confidence level of 95% is not decreased (i.e., the No branch of step 220 (see FIG. 2B) is taken and step 222 (see FIG. 2B) is not performed).

Confidence level generation program 104 (see FIG. 1) uses a predetermined confidence level of 50% and determines that the confidence level of 95% exceeds the predetermined threshold (i.e., 95%>50%). The determination that the confidence level of 95% exceeds the threshold may be included in step 224 (see FIG. 2B). Thus, confidence level generation program 104 (see FIG. 1) determines there is 95% confidence that the user intended that "stuck pipe" is a concept of sentence 302 and retrieves from a knowledge base additional information related to the concept of "stuck pipe" and presents this additional information to the user. The retrieval of the additional information may be included in step 226 (see FIG. 2B).

Example 2

As another example using the same sentence: "pipe got stuck and no downward movement cannot pull up" entered by the user and using the same thresholds and factors mentioned in Example 1, confidence level generation program 104 (see FIG. 1) selects another combination of terms "pipe stuck" and "downward" and determines the confidence level of 95% as shown in Example 1 for "pipe stuck" and selects 100% as the initial confidence level for "downward." For this example, confidence level generation program 104 (see FIG. 1) selects an initial confidence level of 97% for "pipe stuck downward" based on weights assigned to "pipe stuck" and "downward." Confidence level generation program 104 (see FIG. 1) determines the distance to "pipe stuck" is 3 (i.e., the distance to "stuck" is 3) and the distance to "downward" is 6; determines the difference is 6−3 or 3; determines that 3 does not exceed the maximum threshold of 3; assigns 0 to the overage amount; and determines the first score for "pipe stuck" and "downward" is 0 (i.e., overage amount×factor=0×10=0). Using parse tree 114, confidence level generation program 104 (see FIG. 1) determines the depth to "pipe stuck" is 1 and the depth to "downward" is 4. Confidence level generation program 104 (see FIG. 1) determines the difference between the depths to be 3 (i.e., 4−1=3); determines the second score for "pipe stuck" and "downward" to be 5 (i.e., difference between depths×factor=3×5=15); and determines the confidence level to be (97%−first score)−second score=(97%−0%)−15%=82%. In this case, confidence level generation program 104 (see FIG. 1) determines that there is a negation of the term "downward" because "no" and "downward" occur in the same Noun Phrase 316 in parse tree 114. Because there is negation, confidence level generation program 104 (see FIG. 1) decreases the confidence level by a predetermined amount for negation. In this case, the predetermined amount is 50%. Confidence level generation program 104 (see FIG. 1) determines the decreased confidence level to be 82%–50% or 32%. The determination of the 32% confidence level may be included in step 222 in FIG. 2B. Confidence level generation program 104 (see FIG. 1) determines there is 32% confidence that sentence 302 has the concept of "pipe stuck downward." Confidence level generation program 104 (see FIG. 1) determines that the 32% confidence level does not exceed the threshold of 50%; therefore, confidence level generation program 104 (see FIG. 1) does not infer that the user intended sentence 302 to have the concept of "pipe stuck downward".

Example 3

As still another example using the same sentence: "pipe got stuck and no downward movement cannot pull up" entered by the user and using the same thresholds and factors mentioned in Example 1, confidence level generation program 104 (see FIG. 1) selects another combination of terms "move" and "up" and determines a variation of "move" (i.e., "movement") and "up" occur in the sentence. Confidence level generation program 104 (see FIG. 1) determines the distance to "up" is 10 and the distance to "movement" is 7; determines the difference is 10−7 or 3; determines that 3 does not exceed the maximum threshold of 3; assigns 0 to the overage amount; and determines the first score for "movement" and "up" is 0 (i.e., overage amount×factor=0×10=0). Using parse tree 114, confidence level generation program 104 (see FIG. 1) determines the depth to "up" is 5 and the depth to "movement" is 4. Confidence level generation program 104 (see FIG. 1) determines the difference between the depths to be one (i.e., 5−4); determines the second score for "movement" and "up" to be 5 (i.e., difference between depths×factor=1×5=5); and determines the confidence level to be (100%−first score)−second score=(100%−0%)−5%=95%. In this case, confidence level generation program 104 (see FIG. 1) determines that there is a negation of the term "movement" because "no" and "movement" occur in the same Noun Phrase 316 in parse tree 114. Because there is negation, confidence level generation program 104 (see FIG. 1) decreases the confidence level by a predetermined amount for negation. In this case, the predetermined amount is 50%. Confidence level generation program 104 (see FIG. 1) determines the decreased confidence level to be 95%–50% or 45%. The determination of the 45% confidence level may be included in step 222 in FIG. 2B. Confidence level generation program 104 (see FIG. 1) determines there is 45% confidence that sentence 302 has the concept of "move up." Confidence level generation program 104 (see FIG. 1) determines that the 45% confidence level does not exceed the threshold of 50%; therefore, confidence level generation program 104 (see FIG. 1) does not infer that the user intended sentence 302 to have the concept of "move up".

Example 4

As yet another example using the same sentence: "pipe got stuck and no downward movement cannot pull up" entered by the user and using the same thresholds and factors mentioned in Example 1, confidence level generation program 104 (see FIG. 1) selects another combination of terms "pull" and "pipe" and determines that "pull" and "pipe" occur in sentence 302. Confidence level generation program 104 (see FIG. 1) determines the distance to "pull" is 9 and the distance to "pipe" is 1; determines the difference is 9−1 or 8; determines that the difference of 8 exceeds the maximum threshold of 3 by an overage amount of 5 (i.e., difference of 8−threshold of 3=5); and determines the first score for "pull" and "pipe" is 50 (i.e., overage amount×factor=5×10=50). Using parse tree 114, confidence level generation program 104 (see FIG. 1) determines the depth to "pull" is 5 and the depth to "pipe" is 4. Confidence level generation program 104 (see FIG. 1) determines the difference between the depths to be one (i.e., 5−4); determines the second score to be 5 (i.e., difference between depths×factor=1×5=5); and determines the confidence level to be (100%−first score)−second score=(100−50%)−5% or 45%. Confidence level generation program 104 (see FIG. 1) determines that there is a negation (i.e., "cannot") of the term "pull" because "cannot" and "pull" occur in the same Verb Phrase 318 in parse tree 114. Because there is a negation of "pull," confidence level generation program 104 (see FIG. 1) decreases the confidence level by the predetermined amount of 50%. Confidence level generation program 104 (see FIG. 1) determines the confidence level to be 45%–50% or −5%. Any resulting confidence level below 0% is treated by confidence level generation program 104 (see FIG. 1) as a 0% confidence level. Therefore, confidence level generation program 104 (see FIG. 1) determines that there is 0% confidence that the user intended that sentence 302 has the concept "pull pipe".

Computer System

Figure 4:
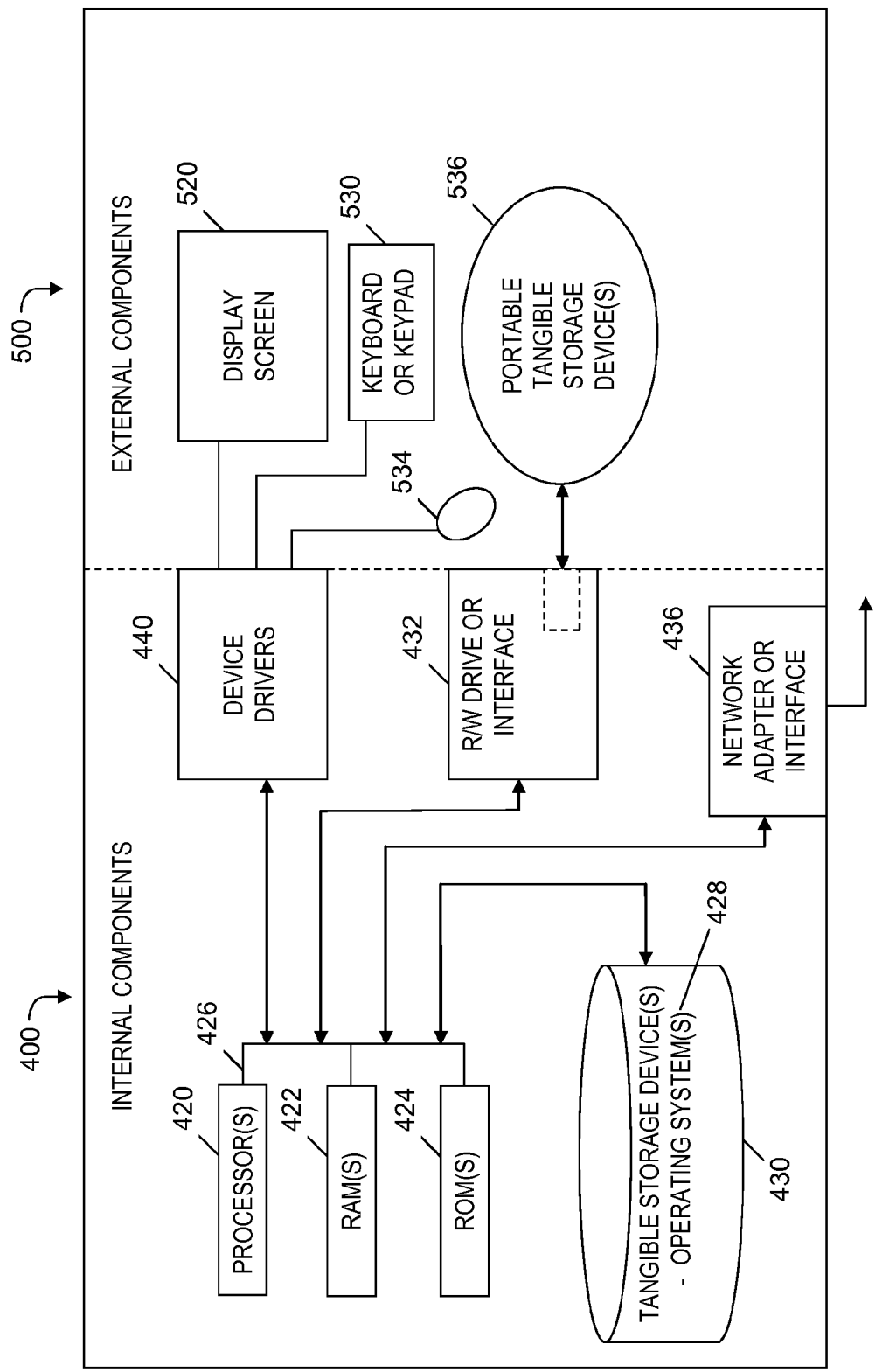
FIG. 4 is a block diagram of a computer system included in the system of FIG. 1 for generating a confidence level of a combination of terms, in accordance with embodiments of the present invention.

FIG. 4 is a block diagram of computer 102 included in the system of FIG. 1 for generating a confidence level of a combination of terms, in accordance with embodiments of the present invention. Computer 102 (see FIG. 1) includes sets of internal components 400 and external components 500 illustrated in FIG. 4. The set of internal components 400 includes one or more processors 420, one or more computer-readable random access memories (RAMs) 422 and one or more computer-readable read-only memories (ROMs) 424 on one or more buses 426, one or more operating systems 428 and one or more computer-readable storage devices 430. The one or more operating systems 428 and program instructions 104 (for computer 102 in FIG. 1) are stored on one or more of the respective computer-readable storage devices 430 for execution by one or more of the respective processors 420 via one or more of the respective RAMs 422 (which typically include cache memory). In the illustrated embodiment, each of the computer-readable storage devices 430 is a magnetic disk storage device of an internal hard drive. Alternatively, each of the computer-readable storage devices 430 is a semiconductor storage device such as ROM 424, erasable programmable read-only memory (EPROM), flash memory or any other computer-readable storage device that can store and retain but does not transmit a computer program and digital information.

The set of internal components 400 also includes a read/write (R/W) drive or interface 432 to read from and write to one or more portable tangible computer-readable storage devices 536 that can store but do not transmit a computer program, such as a CD-ROM, DVD, memory stick, magnetic tape, magnetic disk, optical disk or semiconductor storage device. The program instructions 104 (for computer 102 in FIG. 1) can be stored on one or more of the respective portable tangible computer-readable storage devices 536, read via the respective R/W drive or interface 432 and loaded into the respective hard drive or semiconductor storage device 430. The terms "computer-readable storage device" and "computer-readable storage devices" do not encompass signal propagation media such as copper transmission cables, optical transmission fibers and wireless transmission media.

The set of internal components 400 also includes a network adapter or interface 436 such as a transmission control protocol/Internet protocol (TCP/IP) adapter card or wireless communication adapter (such as a 4G wireless communication adapter using orthogonal frequency-division multiple access (OFDMA) technology). The program 104 (for computer 102 in FIG. 1) can be downloaded to computer 102 (see FIG. 1) from an external computer or external computer-readable storage device via a network (for example, the Internet, a local area network or other, wide area network or wireless network) and network adapter or interface 436. From the network adapter or interface 436, the program 104 (see FIG. 1) is loaded into the respective hard drive or semiconductor storage device 430. The network may comprise copper transmission cables, optical transmission fibers, wireless transmission, routers, firewalls, switches, gateway computers and/or edge servers.

The set of external components 500 includes a display screen 520, a keyboard or keypad 530, and a computer mouse or touchpad 534. The set of internal components 400 also includes device drivers 440 to interface to display screen 520 for imaging, to keyboard or keypad 530, to computer mouse or touchpad 534, and/or to the display screen for pressure sensing of alphanumeric character entry and user selections. The device drivers 440, R/W drive or interface 432 and network adapter or interface 436 comprise hardware and software (stored in storage device 430 and/or ROM 424).

The program 104 (see FIG. 1) can be written in various programming languages (such as C++) including low-level, high-level, object-oriented or non-object-oriented languages. Alternatively, the functions of program 104 (see FIG. 1) can be implemented in whole or in part by computer circuits and other hardware (not shown).

Based on the foregoing, a computer system, method and program product have been disclosed for generating a confidence level of a combination of terms. However, numerous modifications and substitutions can be made without deviating from the scope of the present invention. Therefore, the present invention has been disclosed by way of example and not limitation.

What is claimed is:

1. A method of determining a combination of terms that represents subject matter of a natural language sentence, the method comprising the steps of:
   a computer determining respective numbers of words from a beginning of the sentence to respective terms in the sentence that match terms in the combination of terms;
   the computer dividing the sentence in a multiplicity of natural language phrases including a complex phrase and first and second simple phrases extracted from the complex phrase, the complex phrase being less than an entirety of the sentence;
   based in part on (a) the respective numbers of words from the beginning of the sentence to respective terms in the sentence that match terms in the combination of terms, (b) whether all terms of the combination are contained in the first and/or second simple phrases, and (c) whether all terms of the combination are contained in the complex phrase but not contained in the first and/or second simple phrases, the computer determining a confidence level indicating how well the combination of terms represents a condition or problem which is the subject matter of the sentence;
   the computer generating a table having a top row and other rows, the top row including entries that include respective words in the sentence that match terms in the combination, the other rows including entries that include the multiplicity of natural language phrases, the other rows including first and second rows, the first row including the first and second simple phrases, and the second row including the complex phrase;
   the computer determining respective numbers of rows from the words in the top row that match the terms in the combination to the first row if all terms in the combination are contained in the first and/or second simple phrases, or to the second row if all terms in the combination are contained in the complex phrase but not contained in the first and/or second simple phrases,
   wherein the step of determining the confidence level indicating how well the combination of terms represents the condition or problem which is the subject matter of the sentence is further based in part on the numbers of rows from the words in the top row to the first or second row;
   the computer determining that the confidence level exceeds a threshold;
   in response to the step of determining that the confidence level exceeds the threshold, the computer retrieving contextual information from a knowledge base, the contextual information being related to the subject matter of the sentence; and
   based on the confidence level exceeding the threshold, the computer determining that the contextual information retrieved from the knowledge base is a cause of the condition or problem which is the subject matter of the sentence.

2. The method of claim 1, further comprising the step of:
the computer determining whether a negation is included in a phrase in the sentence, the phrase including a term included in the terms of the sentence that match the terms in the combination of terms, wherein the step of determining the confidence level indicating how well the combination of terms represents the condition or problem which is the subject matter of the sentence is based in part on the negation being included in the phrase in the sentence.

3. The method of claim 1, wherein the step of determining the respective numbers of words includes:
   determining a first number of words from the beginning of the sentence to a first term in the sentence that matches a first term in the combination of terms;
   determining a second number of words from the beginning of the sentence to a second term in the sentence that matches a second term in the combination of terms; and
   determining a difference between the first and second numbers of words, wherein the step of determining the confidence level indicating how well the combination of terms represents the condition or problem which is the subject matter of the sentence is further based in part on the difference between the first and second numbers of words.

4. The method of claim 3, further comprising the steps of:
the computer determining whether the difference between the first and second numbers of words exceeds a threshold;

in response to determining the difference between the first and second numbers of words exceeds the threshold, the computer determining a first amount by which the difference exceeds the threshold;
the computer determining a second amount by multiplying the first amount by a factor; and
the computer adjusting the confidence level indicating how well the combination of terms represents the condition or problem which is the subject matter of the sentence by subtracting the second amount from the confidence level.

5. The method of claim 1, further comprising the steps of:
the computer receiving an ontology that includes rules; and
the computer forming the combination of terms based on the rules included in the ontology.

6. The method of claim 1, wherein the step of determining the respective numbers of rows includes:
the computer determining a difference between first and second numbers of rows included in the numbers of rows;
the computer determining an amount by multiplying the difference by a factor; and
the computer adjusting the confidence level by subtracting the amount from the confidence level.

7. The method of claim 1, further comprising the step of:
the computer receiving the sentence as a transcription of speech that is input as a user query to an expert system by a user,
wherein the steps of receiving the sentence, determining the respective numbers of words, dividing the sentence, determining the confidence level indicating how well the combination of terms represents the condition or problem which is the subject matter of the sentence, generating the table, determining the respective numbers of rows, determining that the confidence level exceeds the threshold, retrieving the contextual information, and determining that the contextual information is the cause of the condition or problem are performed by one or more processors of the computer, the one or more processors executing program instructions via at least one memory of the computer.

8. A computer program product for determining a combination of terms that represents subject matter of a natural language sentence, the computer program product comprising:
one or more computer-readable storage devices and program instructions stored on the one or more storage devices, the program instructions comprising:
program instructions to determine respective numbers of words from a beginning of the sentence to respective terms in the sentence that match terms in the combination of terms;
program instructions to divide the sentence in a multiplicity of natural language phrases including a complex phrase and first and second simple phrases extracted from the complex phrase, the complex phrase being less than an entirety of the sentence; and
program instructions to determine, based in part on (a) the respective numbers of words from the beginning of the sentence to respective terms in the sentence that match terms in the combination of terms, (b) whether all terms of the combination are contained in the first and/or second simple phrases, and (c) whether all terms of the combination are contained in the complex phrase but not contained in the first and/or second simple phrases, a confidence level indicating how well the combination of terms represents a condition or problem which is the subject matter of the sentence;
program instructions to generate a table having a top row and other rows, the top row including entries that include respective words in the sentence that match terms in the combination, the other rows including entries that include the multiplicity of natural language phrases, the other rows including first and second rows, the first row including the first and second simple phrases, and the second row including the complex phrase;
program instructions to determine respective numbers of rows from the words in the top row that match the terms in the combination to the first row if all terms in the combination are contained in the first and/or second simple phrases, or to the second row if all terms in the combination are contained in the complex phrase but not contained in the first and/or second simple phrases, wherein a determination of the confidence level indicating how well the combination of terms represents the condition or problem which is the subject matter of the sentence resulting from an execution of the program instructions to determine the confidence level indicating how well the combination of terms represents the condition or problem which is the subject matter of the sentence is further based in part on the numbers of rows from the words in the top row to the first or second row;
program instructions to determine that the confidence level exceeds a threshold;
program instructions to retrieve, in response to determining that the confidence level exceeds the threshold, contextual information from a knowledge base, the contextual information being related to the subject matter of the sentence; and
program instructions to determine, based on the confidence level exceeding the threshold, that the contextual information retrieved from the knowledge base is a cause of the condition or problem which is the subject matter of the sentence.

9. The computer program product of claim 8, further comprising:
program instructions, stored on at least one of the one or more storage devices, to determine whether a negation is included in a phrase in the sentence, the phrase including a term included in the terms of the sentence that match the terms in the combination of terms, wherein determining the confidence level indicating how well the combination of terms represents the condition or problem which is the subject matter of the sentence by the program instructions to determine the confidence level is based in part on the negation being included in the phrase of the sentence.

10. The computer program product of claim 8, wherein the program instructions to determine the respective numbers of words includes:
program instructions to determine a first number of words from the beginning of the sentence to a first term in the sentence that matches a first term in the combination of terms;
program instructions to determine a second number of words from the beginning of the sentence to a second term in the sentence that matches a second term in the combination of terms; and
program instructions to determine a difference between the first and second numbers of words, wherein determining the confidence level by the program instructions to determine the confidence level indicating how well the combination of terms represents the condition or problem which is the subject matter of the sentence is based in part on the difference between the first and second numbers of words.

11. The computer program product of claim 10, further comprising:
program instructions, stored on at least one of the one or more storage devices, to determine whether the difference between the first and second numbers of words exceeds a threshold;
program instructions, stored on at least one of the one or more storage devices, to determine, in response to determining the difference between the first and second numbers of words exceeds the threshold, a first amount by which the difference exceeds the threshold;
program instructions, stored on at least one of the one or more storage devices, to determine a second amount by multiplying the first amount by a factor; and
program instructions, stored on at least one of the one or more storage devices, to adjust the confidence level by subtracting the second amount from the confidence level.

12. The computer program product of claim 8, further comprising:
program instructions, stored on at least one of the one or more storage devices, to receive an ontology that includes rules; and
program instructions, stored on at least one of the one or more storage devices, to form the combination of terms based on the rules included in the ontology.

13. A computer system for determining a combination of terms that represents subject matter of a natural language sentence, the computer system comprising:
one or more processors;
one or more computer-readable memories;
one or more computer-readable storage devices; and
program instructions stored on the one or more storage devices for execution by the one or more processors via the one or more memories, the program instructions comprising:
first program instructions to determine respective numbers of words from a beginning of the sentence to terms in the sentence that match terms in the combination of terms;
second program instructions to divide the sentence in a multiplicity of natural language phrases including a complex phrase and first and second simple phrases extracted from the complex phrase, the complex phrase being less than an entirety of the sentence; and
third program instructions to determine, based in part on (a) the respective numbers of words from the beginning of the sentence to respective terms in the sentence that match terms in the combination of terms, (b) whether all terms of the combination are contained in the first and/or second simple phrases, and (c) whether all terms of the combination are contained in the complex phrase but not contained in the first and/or second simple phrases, a confidence level indicating how well the combination of terms represents a condition or problem which is the subject matter of the sentence;
fourth program instructions to generate a table having a top row and other rows, the top row including entries that include respective words in the sentence that match terms in the combination, the other rows including entries that include the multiplicity of natural language phrases, the other rows including first and second rows, the first row including the first and second simple phrases, and the second row including the complex phrase;
fifth program instructions to determine respective numbers of rows from the words in the top row that match the terms in the combination to the first row if all terms in the combination are contained in the first and/or second simple phrases, or to the second row if all terms in the combination are contained in the complex phrase but not contained in the first and/or second simple phrases,
wherein a determination of the confidence level indicating how well the combination of terms represents the condition or problem which is the subject matter of the sentence resulting from an execution of the third program instructions is further based in part on the numbers of rows from the words in the top row to the first or second row;
sixth program instructions to determine that the confidence level exceeds a threshold;
seventh program instructions to retrieve, in response to determining that the confidence level exceeds the threshold, contextual information from a knowledge base, the contextual information being related to the subject matter of the sentence; and
eighth program instructions to determine, based on the confidence level exceeding the threshold, that the contextual information retrieved from the knowledge base is a cause of the condition or problem which is the subject matter of the sentence.

14. The computer system of claim 13, further comprising:
ninth program instructions, stored on at least one of the one or more storage devices for execution by at least one of the one or more processors via at least one of the one or more memories, to determine whether a negation is included in a phrase in the sentence, the phrase including a term included in the terms of the sentence that match the terms in the combination of terms, wherein determining the confidence level by and execution of the third program instructions to determine the confidence level indicating how well the combination of terms represents the condition or problem which is the subject matter of the sentence is based in part on the negation being included in the phrase of the sentence.

15. The computer system of claim 13, wherein the first program instructions to determine the respective numbers of words includes:
ninth program instructions to determine a first number of words from the beginning of the sentence to a first term in the sentence that matches a first term in the combination of terms;
tenth program instructions to determine a second number of words from the beginning of the sentence to a second term in the sentence that matches a second term in the combination of terms; and
eleventh program instructions to determine a difference between the first and second numbers of words, wherein determining the confidence level by an execution of the third program instructions to determine the confidence level indicating how well the combination of terms represents the condition or problem which is the subject matter of the sentence is based in part on the difference between the first and second numbers of words.

16. The computer system of claim 15, further comprising:

twelfth program instructions, stored on at least one of the one or more storage devices for execution by at least one of the one or more processors via at least one of the one or more memories, to determine whether the difference between the first and second numbers of words exceeds a threshold;

thirteenth program instructions, stored on at least one of the one or more storage devices for execution by at least one of the one or more processors via at least one of the one or more memories, to determine, in response to determining the difference between the first and second numbers of words exceeds the threshold by an execution of the twelfth program instructions, a first amount by which the difference exceeds the threshold;

fourteenth program instructions, stored on at least one of the one or more storage devices for execution by at least one of the one or more processors via at least one of the one or more memories, to determine a second amount by multiplying the first amount by a factor; and fifteenth program instructions, stored on at least one of the one or more storage devices for execution by at least one of the one or more processors via at least one of the one or more memories, to adjust the confidence level by subtracting the second amount from the confidence level.

17. The computer system of claim 13, further comprising:

ninth program instructions, stored on at least one of the one or more storage devices for execution by at least one of the one or more processors via at least one of the one or more memories, to receive an ontology that includes rules; and tenth program instructions, stored on at least one of the one or more storage devices for execution by at least one of the one or more processors via at least one of the one or more memories, to form the combination of terms based on the rules included in the ontology.

\* \* \* \* \*